(12) United States Patent
Nakamura et al.

(10) Patent No.: US 6,258,222 B1
(45) Date of Patent: Jul. 10, 2001

(54) ELECTROLYZER

(75) Inventors: Shinichi Nakamura; Kazunori Hirao; Kunihiko Fukuzuka, all of Osaka (JP)

(73) Assignee: Omega Go., Ltd., Osaka (JP)

( * ) Notice: Subject to any disclaimer, the term of this patent is extended or adjusted under 35 U.S.C. 154(b) by 0 days.

(21) Appl. No.: 09/217,818

(22) Filed: Dec. 22, 1998

(30) Foreign Application Priority Data

Dec. 26, 1997 (JP) .................................................. 9-369487

(51) Int. Cl.[7] .............................. C25B 9/00; C25B 11/00; C25B 11/04
(52) U.S. Cl. ................... 204/242; 204/279; 204/290.01; 204/291
(58) Field of Search ................................. 204/292, 279, 204/242, 275, 280

(56) References Cited

U.S. PATENT DOCUMENTS

| | | | |
|---|---|---|---|
| 4,039,417 | * 8/1977 | Sasaki et al. | 204/291 X |
| 4,194,960 | * 3/1980 | Bleikamp, Jr. | 204/280 |
| 4,279,729 | * 7/1981 | Bushman et al. | 204/280 |
| 4,338,510 | * 7/1982 | Chichara et al. | 204/292 X |
| 4,621,420 | * 11/1986 | Takahashi et al. | 204/294 X |
| 4,814,055 | * 3/1989 | Koziol et al. | 204/279 X |
| 5,885,427 | * 3/1999 | Pickering et al. | 204/292 X |

FOREIGN PATENT DOCUMENTS

| | | |
|---|---|---|
| 4-28438 | 5/1992 | (JP) . |
| 9-108307 | 4/1997 | (JP) . |

* cited by examiner

Primary Examiner—Donald R. Valentine
(74) Attorney, Agent, or Firm—Rader, Fishman & Grauer (57) ABSTRACT

An electrolyzer 1 for electrolyzing water existing between electrode plates 4, 5 disposed at a prescribed interval by imposing a voltage between the electrode plates is arranged such that at least the electrode plate 5 acting as an anode comprises a ferrite electrode including at least one hole 15 is formed therein, the interval between the hole and an extreme or terminal end of an electrode terminal 9 inserted into the hole 15 is filled with a conductive metal coupling member 16 that becomes deformed when the electrode terminal 9 is inserted in the hole so that the ferrite electrode 5 is made conductive to and arranged integrally with the electrode terminal 9. Accordingly, in the electrolyzer 1, the coupling resistance between the electrode terminal 9 and the electrode plate 5 is reduced as well as a large processing current can be flowed to the electrolyzer 1 for a long time even under conditions of low conductivity in which water having low conductivity is used, or the amount of an electrolyte required or necessary to be added to the water is reduced or minimized to some extent.

19 Claims, 5 Drawing Sheets

ELECTROLYZER

BACKGROUND OF THE INVENTION

1. Field of the Invention

The present invention relates to an improved electrolyzer suitable for the manufacture of electrolyzed water having a sterilizing power and for purification and filtration of water, such as waste water, water used with raising fish bath and pool water, cooling water, water used in sewage processing, and the like.

2. Description of Related Art

Electrolyzers used to manufacture electrolyzed water such as described above form functional water (alkali ion water and strong acid water). Such electrolyzers typically employ a ferrite electrode to which an electrode terminal is formed through a conductive bond as an anode because it needs only a small processing current and electrolysis can be performed using a partition wall interposed between the ferrite electrode and a cathode.

In order to form weakly acid or neutral sterilizing/rinsing water and for the purification and sterilization of waste water and various kinds of water, a large processing current is typically required. Accordingly, when a ferrite electrode is used as described above, the conductive bond between the electrode terminal and the ferrite electrode is removed therefrom due to the difference between their respective coefficients of thermal expansion because they are repeatedly heated and cooled, and due to the resistance of the coupling portion increased by the conductive bond. As a result, the coupling resistance is increased by the invasion of water into the interval between the conductive bond and the ferrite electrode and the electrode terminal as well as the fact that the conductive bond becomes eluded into electrolyzed water and is made unusable at once because it has bad chemical resistance.

To cope with the above problem, electrolysis has been executed using a platinum-plated titanium electrode which has platinum plated on the surface of titanium without using a partition wall because an electrode terminal can easily be formed from titanium by welding, screw cutting or the like and titanium is less eluded in electrolysis.

A reason why the above platinum-plated titanium is used as an anode is that platinum, ferrite, lead and titanium have higher resistance to elusion in the above order and the expensive platinum has the highest elusion resistance in the above metals. However, when a platinum-plated titanium electrode is used and the voltage imposed on the electrode and a processing current is increased, a problem arises that the plated platinum becomes exfoliated, titanium is eluded, and the anode electrode becomes corroded.

Therefore, to prevent the exfoliation, an electrolyte such as salt or the like must be added to the water to be processed by the electrolyzer to increase the conductivity of the water.

SUMMARY OF THE INVENTION

An object of the present invention made in view of the above problems is to provide an electrolyzer capable of performing electrolysis with a large processing current for a long time even under the conditions of low conductivity, so that the coupling resistance between the electrode terminal and the electrode plate is low and water having low conductivity or water to which a relatively small or lesser amount of an electrolyte is needed or used.

In accordance with these and other objects, there is provided an electrolyzer suitable for electrolyzing water existing between electrode plates disposed at a prescribed interval by imposing a voltage between the electrode plates, electrolyzer comprising: an electrode plate acting as an anode comprising a ferrite electrode. The ferrite electrode includes at least one hole formed therein. The electrolyzer also includes an electrode terminal inserted in the hole, and an interval exists between the hole and a terminal end of the electrode terminal that is filled with a conductive metal coupling member and becomes deformed when the electrode terminal is inserted in the hole, so that the ferrite electrode is made conductive to and arranged integrally with the electrode terminal.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 4a and FIG. 4b are outside appearance perspective views showing how an anode plate and an electrode terminal used in an electrolyzer of a fourth embodiment of the present invention are coupled with each other.

DETAILED DESCRIPTION OF A PREFERRED EMBODIMENT

To solve the above problems an electrolyzer of the present invention for electrolyzing water existing between electrode plates disposed at a prescribed interval by imposing a voltage between the electrode plates is characterized in that at least the electrode plate acting as an anode is composed of a ferrite electrode, at least one hole is formed in the ferrite electrode, the interval between the hole and an extreme end of an electrode terminal inserted into the hole is filled with a conductive metal coupling member that becomes deformed when the electrode terminal is inserted so that the ferrite electrode is made conductive to and arranged integrally with the electrode terminal.

According to the above feature, since the metal coupling member is deformed by the insertion of the electrode terminal and the interval between the extreme or terminal end of the electrode terminal and the hole is filled with the metal coupling member, the electrode terminal can be coupled with the electrode plate by using a metal element or a metal body having a remarkably low conducting resistance, whereby the heat generation at the coupling portion can be effectively suppressed.

Further, since the coefficient of thermal expansion of the metal coupling member is preferably approximately the same as those of the ferrite electrode and the electrode terminal, even if the metal coupling member is expanded by being heated; no or substantially no interval is formed therebetween so that a coupling resistance is not substantially increased or increased at all by the invasion of water into the coupling portion.

Therefore, a large current can be flowed to the ferrite electrode for a long time, and, as a result, electrolysis processing can be performed without adding an electrolyte or the like to the water, or the amount of electrolyte added thereto can be as small as possible.

In an electrolyzer of the present invention, it is preferable that the metal coupling member comprise a highly conductive metal which is softer than the ferrite electrode and the electrode terminal.

With this arrangement, not only the metal coupling member is liable to be deformed and the electrode terminal can be easily inserted, but also the ferrite electrode and the electrode terminal are generally neither chipped nor deformed.

In the electrolyzer of the present invention, it is preferable that the metal coupling member comprise a lead simple body (that is, a lead elemen), lead or lead alloy.

With this arrangement, since the lead or the lead alloy is softer than the ferrite, has a plastically deforming property which permits it to be deformed by the insertion of the electrode terminal, a specific resistance smaller than that of the ferrite and resistance to elution similar to that of the ferrite and is less expensive, the electrode terminal can be coupled with the electrode with a small resistance at a low cost and the durability of them can be increased.

In the electrolyzer of the present invention, it is preferable that the metal coupling member is low melting temperature metal that melts at a temperature of 500° C. or less and the metal coupling member becomes melted and solidified after it is deformed.

With this arrangement, when the metal coupling member is melted, not only the interval between the electrode terminal and the ferrite electrode can be more finely filled with the metal coupling member and the invasion of the water can be more perfectly prevented, but also the coupling resistance can be reduced and stabilized because the electrode terminal is in contact with the ferrite electrode in a larger area.

In the electrolyzer of the present invention, it is preferable that an irregular section (that is, an uneven face) is formed to the surface of the extreme or terminal end of the electrode terminal which is inserted into the hole.

With this arrangement, when the metal coupling member is deformed or melted, it is engaged with the irregular section or uneven face. As a result, not only is the contact area increased and the coupling resistance more reduced and stabilized, but also the coupling strength of the electrode terminal with the metal coupling member is increased, whereby the ferrite electrode can be strongly arranged integrally with the electrode terminal.

In the electrolyzer of the present invention, it is preferable that a seal member be disposed adjacent to or near the opening of the hole to close the hole.

With this arrangement, the invasion of the water and the like into the hole can be prevented or reduced. Accordingly, not only elusion of the metal coupling member itself by electrolysis can be prevented, but also the invasion of the water into the portion where the ferrite electrode and the extreme or terminal end of the electrode terminal are coupled with the metal coupling member can be more perfectly shut off; thereby the life of the electrode can be prolonged.

An electrolyzer of the present invention for electrolyzing water existing between electrode plates disposed at a prescribed interval by imposing a voltage between the electrode plates is characterized in that at least the electrode plate acting as an anode is composed of a ferrite electrode, at least one hole is formed to the ferrite electrode, a spring member composed of a conductive metal simple body (metal element) is formed to the extreme end of an electrode terminal which is accommodated in the hole and deformed and abutted against the inner surface of the hole when the electrode terminal is inserted as well as a lid member composed of a high polymer material is disposed to at least the opening of the hole to isolate the interior of the hole from the water.

According to the feature, the spring member comprising the conductive metal simple body (metal element) is abutted against the inner surface of the hole. Accordingly, a coupling resistance can be made lower than that of a conventional conductive bond as well as the increase in coupling resistance which is caused by the invasion of the water into the portion where the spring member is abutted against the inner surface of the hole can be prevented because the interior of the hole is hermetically sealed by the lid member. Consequently, a large current can be flowed or provided to the ferrite electrode for a long time, and, as a result, electrolysis processing can be performed without adding an electrolyte or the like to the water, or adding it thereto in an amount as small as possible.

Further, since conduction is carried out by the abutment of the spring member against the inner surface of the hole, the electrode terminal can be easily mounted and dismounted.

In the electrolyzer of the present invention, it is preferable that conductive paint is coated to at least the portion where the spring member is abutted against the inner surface of the hole.

With this arrangement, the fine void between the inner surface of the hole of the hard ferrite and the spring member can be filled with a thin coated film of the conductive paint. Therefore, the area where the inner surface of the hole is made conductive to the spring member is increased to thereby stably carry out conduction with a low resistance. In addition, the increase in the resistance of the coupling portion which would be caused by a conductive bond can be prevented or reduced because the coated film is typically always pressed against the inner surface of the hole by the spring member.

In the electrolyzer of the present invention, it is preferable that a soft metal layer comprising a simple body of one or more of lead, tin, copper, zinc, bismuth, cadmium, gallium, indium, silver, palladium, platinum, gold, etc. or an alloy thereof is disposed adjacent to at least the portion where the spring member is abutted against the inner surface of the hole.

With this arrangement, since the fine void between the inner surface of the hole of the hard ferrite and the spring member can be filled with the deformed soft metal layer, the area where the inner surface of the hole is made conductive to the spring member is increased, and conduction can be stably carried out with a low resistance.

Embodiments of the present invention will be described with reference to the accompanying drawings. The drawings are for purposes of illustration and do not limit the invention in any way.

First Embodiment

Figure 1:
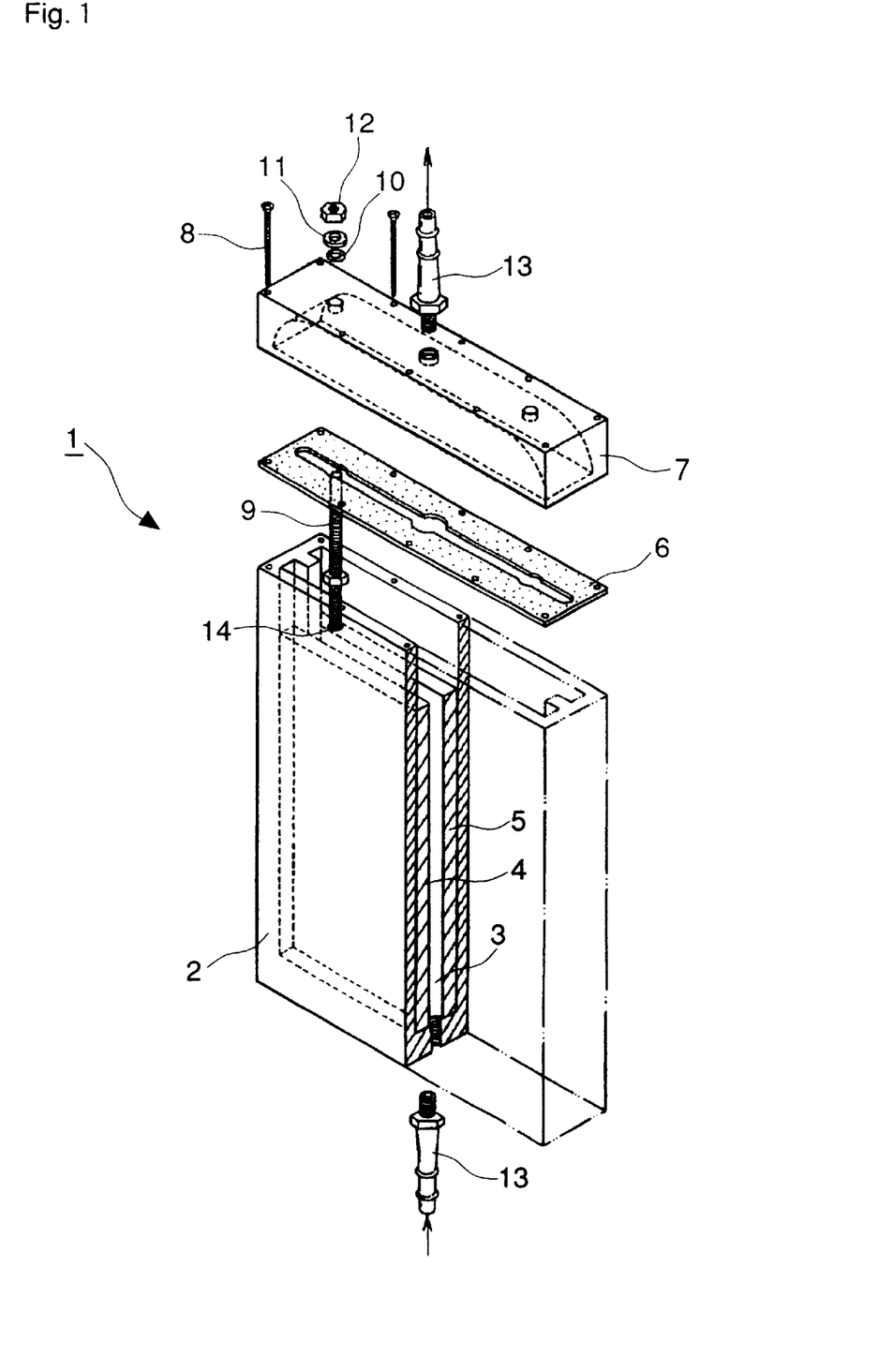
FIG. 1 is an exploded perspective view, partly in cross section, showing the structure of an electrolyzer of a first embodiment of the present invention.

FIG. 1 is an exploded perspective view, partly in cross section, showing the structure of an electrolyzer of a first embodiment of the present invention and FIGS. 2a and 2b are sectional views showing how an anode plate and an electrode terminal used in the electrolyzer of the first embodiment of the present invention can be coupled with each other.

The structure of the electrolyzer 1 of the embodiment 1 has generally the same structure as that of an ordinary electrolyzer used to create electrolyzed water for sterilization and purify water and has an electrolyzing passage 3 formed between an anode plate 5 and a cathode plate 4 as shown in FIG. 1.

A ferrite electrode is preferably used as the anode plate 5 and a titanium electrode as the cathode plate 4 and the anode plate 5 and cathode plate 4 are preferably inserted into a vinyl chloride cabinet 2 which is formed to such a shape so as to set a prescribed interval therebetween. Any interval can be used and can readily be determined by those of skill in the art.

It is preferable to set the interval between the anode plate 5 and the cathode plate 4 to the range of 1–10 and particularly to the range of 3–6 mm and, in the first embodiment, it is set to 6 mm.

The opening of the cabinet 2 at an end thereof is preferably closed by a vinyl chloride lid member 7 fixed thereto by conical screws 8 through a packing 6. Electrode terminals 9 are disposed to the anode plate 5 and cathode plate 4 (the electrode terminal of the cathode plate 4 is not shown) and exposed to the outside of the cabinet 2 passing through the lid member 7. Each of the electrode terminals 9 is preferably fixed to the lid member 7 through an O-ring 10, a round washer 11 and a stainless nut 12. A direct current is preferably supplied to the electrode terminals 9 from a rectifying power supply. Inlet/outlet joints 13 communicating with the electrolyzing passage 3 are preferably disposed to both ends of the electrolyzer 1 so that water can be supplied to the electrolyzing passage 3 from the lower end of the electrolyzer 1 and discharged from an upper end thereof.

Figure 2:
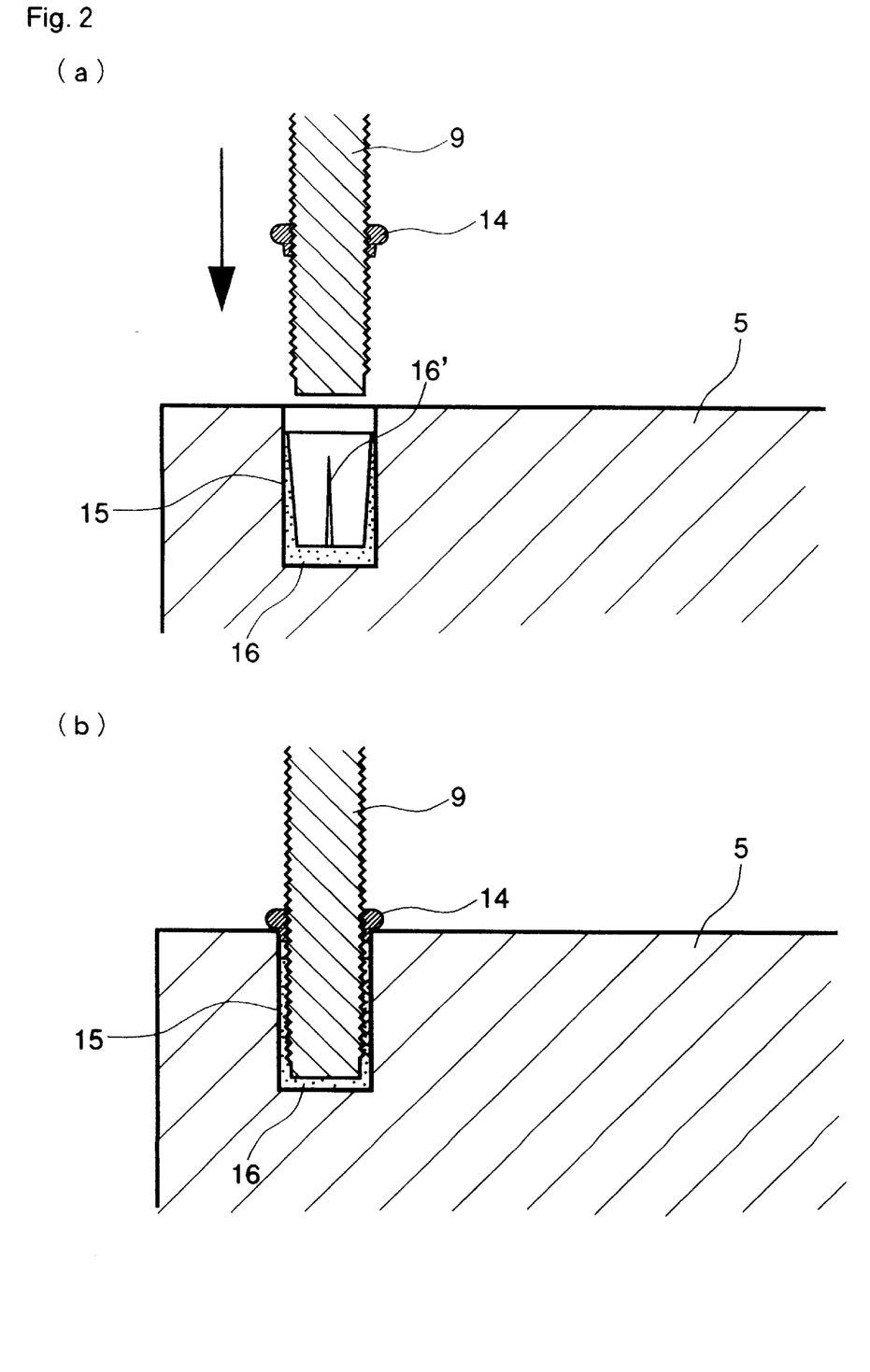
FIG. 2a and FIG. 2b are sectional views showing how an anode plate and an electrode terminal used in the electrolyzer of a first embodiment of the present invention are coupled with each other.

The anode plate 5 used in the first embodiment is preferably arranged as shown in FIG. 2 and the electrode terminal 9 is formed thereto. How the electrode terminal 9 is formed will be described below. The electrode terminals 9 of the first embodiment are preferably composed of titanium and the surface thereof is preferably made irregular by a screw thread.

The anode plate 5 is composed of ferrite as described above. Used as the ferrite is nickel ferrite which can be obtained by any known method, for example, by mixing nickel oxide, etc. as a divalent metal compound with ferric oxide at a prescribed ratio and baking the mixture under proper atmospheric conditions. This is because that the nickel ferrite is excellent in a specific resistance, corrosion resistance, impact resistance and the like. A hole 15 is formed to the nickel ferrite anode plate 5 at a prescribed position thereof to insert the extreme end of the electrode terminal 9 thereinto.

In the first embodiment, a lead coupling plug 16 acting as a metal coupling member is preferably disposed in the hole 15 as shown in FIG. 2a. The coupling plug 16 is preferably formed to a cylindrical shape that is tapered toward an upper end and has an opening at the upper end and the diameter of the interior of the space formed in the coupling plug 16 is slightly larger than the outside shape of the electrode terminal 9 to be inserted thereinto at the upper opening and lightly smaller than the terminal 9 on the bottom of the interior of the space. The coupling plug 16 preferably has at least one and preferably two or three slit grooves 16' formed on the outer periphery thereof at equal intervals.

The electrode terminal 9 generally has a rubber boot 14 movably engaged with the thread screw to close the opening of the hole 15. It is preferable that the rubber boot 14 is composed of a rubber material excellent in chemical resistance, corrosion resistance and humidity resistance because it comes into contact with electrolyzed water having a strong oxidizing power. Fluorine-containing rubber, etc. is exemplified as a particularly suitable rubber material.

As shown in FIG. 2a, when the extreme end of the electrode terminal 9 is screwed and inserted into the hole 15 where the coupling plug 16 is disposed, the coupling plug 16 preferably becomes deformed and invaded into the grooves formed on the electrode terminal 9 as well as the interval between the electrode terminal 9 and the hole 15 becomes filled with the coupling plug 16. This is because that the coupling plug 16 is composed of lead preferably having a Moh's hardness of about 1.5 or of 1.5, whereas the ferrite of the anode plate 5 and the electrode terminal 9 preferably have a Moh's hardness of 4 or less. As a result, the electrode terminal 9 is made conductive to and arranged integrally with the anode plate 5. Subsequently, the rubber boot 14 is turned and screwed into the opening of the hole 15 to thereby hermetically seal the interior of the hole 15.

The anode plate 5 to which the electrode terminal 9 was formed as described above can be mounted on the electrolyzer 1 to perform an electrolysis test which will be described below.

Second Embodiment

In the second embodiment, the lead coupling plug 16 used in the first embodiment is composed of solder having a low melting point of about 200° C. An electrode terminal 9 is inserted into a hole 15 likewise to the first embodiment and the electrode terminal 9 is preferably made conductive to and arranged integrally with an anode plate 5 and thereafter ultrasonic waves are preferably applied to the electrode terminal 9 to heat the boundaries where the coupling plug 16, the electrode terminal 9 and the anode plate 5 are coupled with each other. The low melting point solder preferably is heated and melted with a carbonic acid gas laser and then cooled and solidified. The anode plate 5 to which the electrode terminal 9 is formed as described above is preferably mounted on the electrolyzer 1 in a similar manner as in the first embodiment 1 to perform the electrolysis test which will be described below.

In the second embodiment, the heating with the ultrasonic waves is preferably executed prior to the execution of the heating with the carbonic acid gas laser. Such an operation is preferable because the conductive resistance of the electrode terminal 9 and the anode plate 5 can be further reduced and stabilized by breaking the oxide films existing on the surface of the titanium of the electrode terminal 9 and the surface of the ferrite of the anode plate 5.

Although the low melting point solder is preferably heated by the carbonic acid gas laser in the second embodiment, it may be heated by, for example, hot air or the like. However, it is preferable to use the carbonic acid gas laser to effectively heat the low melting point solder because the members which exist in the vicinity of the solder generally have high thermal conductivity.

Third Embodiment

FIGS. 3a and 3b are outside appearance perspective views showing how an electrode terminal 9 and an anode plate 5 used in a third embodiment of the present invention can be coupled with each other.

Figure 3:
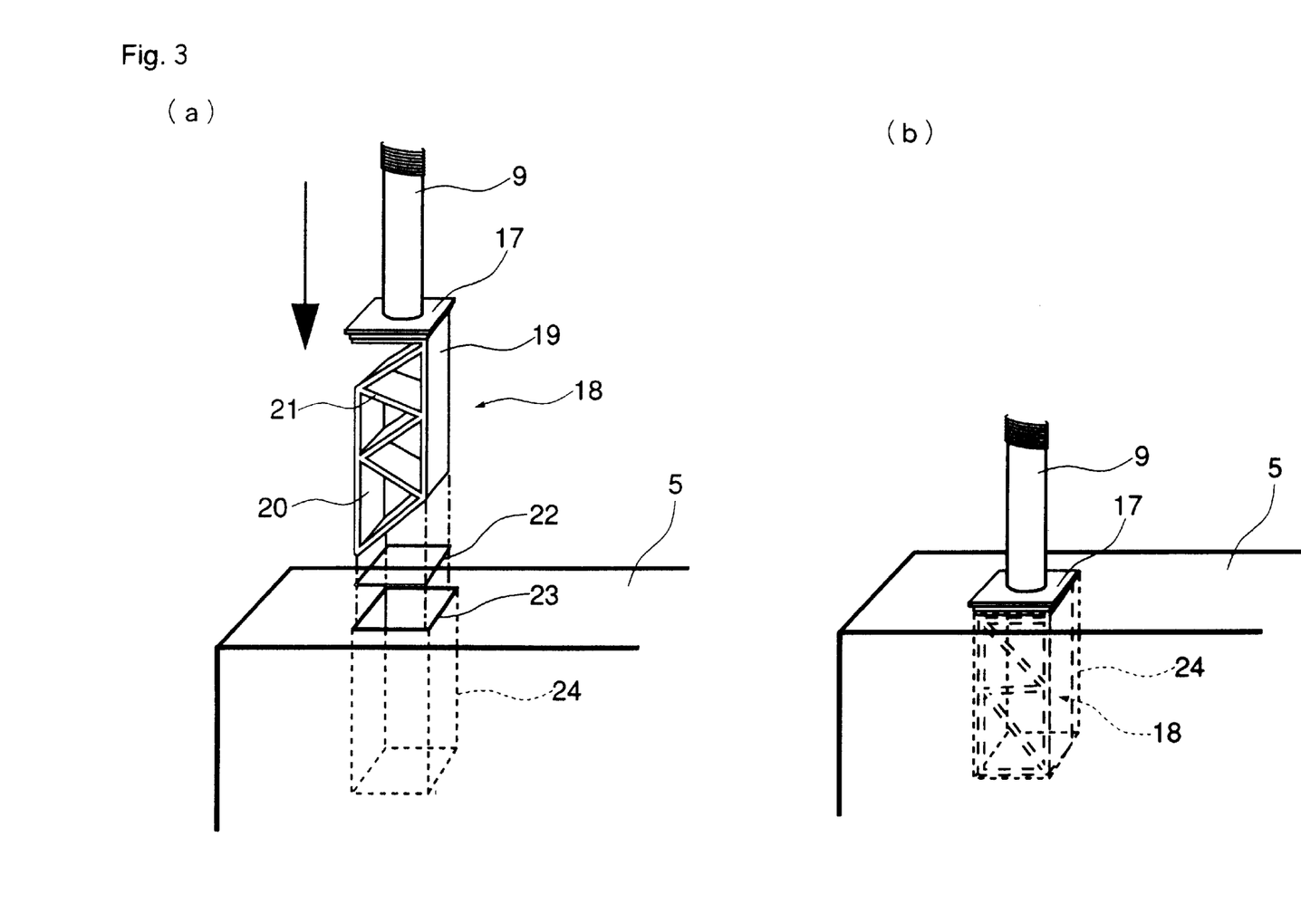
FIG. 3a and FIG. 3b are outside appearance perspective views showing how an anode plate and an electrode terminal used in an electrolyzer of a third embodiment of the present invention are coupled with each other.

The anode plate 5 of the third embodiment is preferably arranged as shown in FIG. 3. Nickel ferrite is used as the anode plate 5 in a likewise manner to the embodiment and a quadrangular-prismshaped hole 24 is preferably formed to the anode plate 5 at a prescribed position thereof.

In the third embodiment, a spring member 18 as shown in FIG. 3a is preferably connected to the terminal or extreme end of the electrode terminal 9 to be accommodated in the hole 24 and a vinyl chloride lid member 17 is preferably disposed at the upper end of the spring member 18 to hermetically seal the interior of the hole 24 by the engagement with a packing 22.

The spring member 18 is preferably composed of a b-shaped side plate a 19, a side plate b 20 located opposite to the side plate a 19 and a wave-shaped coupling plate 21 for coupling the side plate a 19 with the side plate b 20 and these members are preferably formed by processing a titanium plate.

A conductive silver/palladium paint is preferably coated on the outside surfaces of the side plates a 19 and b 20 to a film thickness of about 50 microns, although any desirable thickners can be used.

When the spring member 18 disposed at the terminal or extreme end of the electrode terminal 9 as described above is inserted into the hole 24, the lower end thereof is preferably abutted against the bottom of the hole 24 and deformed so as to spread toward the side plate direction as shown in FIG. 3a. Accordingly, the outside surfaces of the side plates a 19 and b 20 preferably come into contact with the inner surface of the hole 24 under pressure so that the electrode terminal 9 is made conductive to and arranged integrally with the anode plate 5. The interior of the hole 24 is preferably hermetically sealed by the engagement of the lid member 17 disposed to the upper end of the spring member 18 with the inner wall portion of the hole 24 through the packing 22, whereby the restore of the spring member 18 is suppressed.

The anode plate 5 obtained as described above can be mounted on the electrolyzer 1 in a manner similar to the embodiment to perform the electrolysis test which will be described below.

Fourth Embodiment

FIGS. 4a and 4b are outside appearance perspective views showing how an anode plate 5 and an electrode terminal 9 used in a fourth embodiment can be coupled with each other.

The anode plate 5 of the fourth embodiment 4 can be arranged as shown in FIGS. 4a and 4b. Nickel ferrite is preferably used as the anode plate 5 in a manner similar to the first embodiment and a cylindrical hole 29 is preferably formed to the anode plate 5 at a prescribed position thereof.

In the fourth embodiment, a spiral spring member 27 preferably composed of titanium is formed to a prescribed length so as to surround the outer periphery of an extreme or terminal end of the electrode terminal 9 to be accommodated in a hole 29 as shown in FIG. 4a. A vinyl chloride lid member 25 is preferably disposed about the electrode terminal 9 at an upper end of the spring member 27 in a manner similar to the third embodiment and an O-ring-like rubber packing 26 is preferably disposed just under the lid member 25.

A solder layer of about 20 microns thick is preferably formed about the outer periphery of the titanium spring member 27 as a soft metal layer by solder plating.

When the spring member 27 arranged as described above is inserted into the hole 29, it is preferably abutted against the bottom of the hole 29 and deformed with its diameter extending in an outer peripheral direction and the outer periphery of the spring member 27 preferably comes into contact with an inner side wall of the hole 29 so that the electrode terminal 9 is made conductive to and arranged integrally with the anode plate 5. Accordingly, the rubber packing 26 disposed just under the lid member 25 which is located at an upper portion of the spring member 27 is preferably clamped between the side wall of the hole 29 in the vicinity of the opening 28 thereof and the electrode terminal 9 so that the interior of the hole 29 is hermetically sealed as well as the electrode terminal 9 is engaged with the anode plate 5 so as to suppress the restoration of the spring member 27.

The anode plate 5 obtained as described above is preferably capable of being mounted on the electrolyzer 1 in a manner similar to the first embodiment to perform the electrolysis test which will be described below.

COMPARATIVE EXAMPLE

As a comparative example, an anode was prepared as an conventional anode in such a manner that the hole 15 of the anode plate 5 of the first embodiment was filled with Three Bond 3381 (Trade name of Three Bond Co. Ltd., volume specific resistance: 0.01 Ωcm) as an acrylic resin conductive bond containing a nickel filler as a conductive filler in place of the lead coupling plug 16 of the first embodiment, the electrode terminal 9 (excluding the rubber boot 14) was inserted into the hole 15 and the conductive bond was dried and solidified. The thus prepared anode was mounted on the electrolyzer 1 in a manner similar to the first inventive embodiment to perform the electrolysis test which will be described below.

Figure 5:
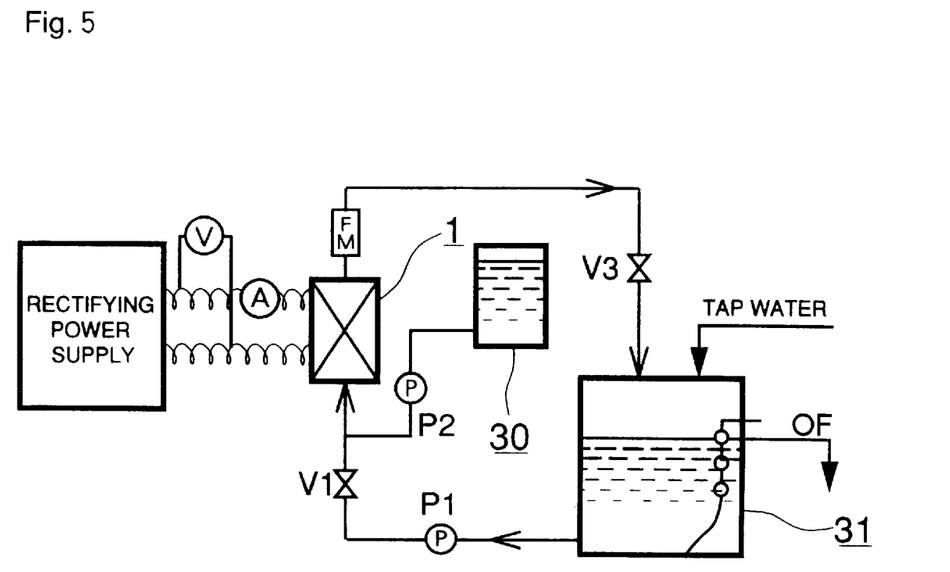
FIG. 5 is a system flowchart showing an evaluation system according to the present invention.

In the above embodiments and comparative embodiment in which the anode plates 5 were coupled with the electrode terminals 9, the resistance and the dispersion of the resistance of each of the electrode terminals 9 and the ferrite electrodes were measured with a tester abutted thereto as to 20 samples chosen at random as well as the electrolyzers 1 to which the respective anode plates 5 were mounted and assembled to an evaluation system shown in the flowchart of FIG. 5 and an electrolyzing test was performed to evaluate the life of the electrodes.

In FIG. 5, V denotes valves, P denotes pumps and FM denotes a flow meter.

The evaluation system is as follows. Tap water stored in an electrolyzed water tank 31 is supplied into the electrolyzer 1 from the lower portion thereof by a pump D1; while the tap water is supplied into the electrolyzer 1, a sodium bromide aqueous solution in the electrolyte aqueous solution tank 30 is suitably added to the tap water by a pump P2; and electrolyzed water created by electrolyzing the tap water in the electrolyzer 1 is stored in the electrolyzed water tank 31. Electrolyzed water containing highly concentrated residual chlorine can be created by repeating the above process. The electrolyzed water which exceeds a prescribed amount overflows from the electrolyzed water tank 31.

A rectifying power supply is connected to the electrolyzer 1 and an ammeter (ampere meter) and a voltmeter are connected to the electrolyzer 1 to measure the current and voltage supplied from the rectifying power supply.

As to the operating conditions of the evaluation system, since the conductivity of water used in a bath and pool can be as low as 400–800μ, the conductivity of the tap water adjusted by the sodium bromide aqueous solution was also controlled to the above range, a voltage was controlled so that an electric current density was set to 5 Amp/dm$^2$, the rectifying power supply was controlled to turn on for 15 seconds and turn off for 5 seconds by a timer assembled to the system and this cycle was counted as one count by a counter.

Since the cycle of the turned-on-time of 15 seconds and turned-off-time of 5 seconds is an average time during which hands and the like are washed in hospitals and the like, this cycle was used as the cycle for evaluation.

The result of the evaluation test for the resistance and electrode life is as shown below.

TABLE 1

| | Current value: 5 Amp | | | |
|---|---|---|---|---|
| | Resistance A ($\Omega$) | Dispersion ($\Omega$) | Resistance A ($\Omega$) when 100,000 times are counted | Voltage variation (V) |
| Example 1 | 0.92 | ±0.07 | 0.93 | 4.9–5.1 |
| Example 2 | 0.88 | ±0.03 | 0.88 | 4.9–5.1 |
| Example 3 | 0.96 | ±0.12 | 1.01 | 5.0–5.3 |
| Example 4 | 0.94 | ±0.10 | 0.97 | 4.9–5.2 |
| Comparative Example | 1.20 | ±0.20 | 1.45* | 5.1–8.5 |

*Resistance A at 20,000 counts (operation could not be continued due to drop of current)

As shown in Table 1, the coupling resistances between the electrode terminals and the ferrite electrodes were relatively low in the electrolyzers using the anodes of the above respective embodiments as compared with those of the conventional comparative example and further they are less dispersed. Further the voltages did not remarkably increase even if the cycle exceeded 100,000 counts; whereas the voltages in the electrolyzer of the comparative example increased at about 20,000 counts and the prescribed electric current of 5 Amp/dm$^2$ could not be supplied and accordingly the test was interrupted.

The present invention will generally achieve at least the following advantages. (a) According to a first aspect of the present invention, since the metal coupling member is deformed by the insertion of the electrode terminal and the interval between the extreme or terminal end of the electrode terminal and the hole is filled with the metal coupling member, the electrode terminal can be coupled with the electrode plate through the metal simple body (metal element) having a remarkably low conducting resistance, whereby the heat generation at the coupling portion can effectively be suppressed.

Further, since the coefficient of thermal expansion of the metal coupling member can be approximately the same as that of the ferrite electrode and the electrode terminal, even if the metal coupling member is expanded by being heated, substantially no interval is caused therebetween, so that a coupling resistance is not increased by the invasion of the water into the coupling portion.

Therefore, a large current can be provided to the ferrite electrode for a long time, and, as a result, electrolysis processing can be performed without adding an electrolyte or the like to the water or adding it thereto in an amount as smaller as possible.

(b) According to a second aspect of the present invention, not only the metal coupling member is liable to be deformed and the electrode terminal can be easily inserted but also the ferrite electrode and the electrode terminal are neither chipped nor deformed.

(c) According to a third aspect of the present invention, a lead or a lead alloy is employed which is softer than the ferrite and has a plastically deforming property which permits it to be deformed by the insertion of the electrode terminal and its specific resistance smaller than that of the ferrite, the degree of the resistance to elution thereof ranks next to that of the ferrite and the lead or the lead alloy is less expensive. Accordingly, the electrode terminal can be coupled with the electrode with a small resistance at a low cost and the durability of them can be increased.

(d) According to a fourth aspect of the present invention, when the metal coupling member is melted, not only can the interval between the electrode terminal and the ferrite electrode be more finely filled with the metal coupling member and the invasion of the water can be more perfectly prevented, but also the coupling resistance can be reduced and stabilized because the electrode terminal is in contact with the ferrite electrode in a larger area.

(e) According to a fifth aspect of the present invention, when the metal coupling member is deformed or melted, it is engaged with the irregular section. As a result, not only is the contact area increased and the coupling resistance more reduced and stabilized, but also the coupling strength of the electrode terminal with the metal coupling member is increased. Thus, the ferrite electrode can be strongly arranged integrally with the electrode terminal.

(f) According to a sixth aspect of the present invention, the invasion of the water and the like into the hole can be prevented. Therefore, not only can elusion of the metal coupling member itself by electrolysis be prevented, but also the invasion of the water into the portion where the ferrite electrode and the extreme or terminal end of the electrode terminal are coupled with the metal coupling member can be more perfectly shut off. Thus, the life of the electrode can be prolonged.

(g) According to a seventh aspect of the present invention, the spring member composed of a conductive metal simple body (metal element) is preferably abutted against the inner surface of the hole. Therefore, the coupling resistance can be lower than that of a conventional conductive bond. In addition, the increase in coupling resistance which is caused by the invasion of the water into the portion where the spring member is abutted against the inner surface of the hole can be prevented because the interior of the hole is hermetically sealed by the lid member. Consequently, a large current can be flown to the ferrite electrode for a long time, and, as a result, electrolysis processing can be performed without adding an electrolyte or the like to the water or adding it thereto in an amount as small as possible.

Further, since conduction is carried out by the abutment of the spring member against the inner surface of the hole, the electrode terminal can be easily mounted and dismounted.

(h) According to an eighth aspect of the present invention, the fine void between the inner surface of the hole of the hard ferrite and the spring member can be filled with a thin coated film of the conductive paint. Therefore, the area where the inner surface of the hole is made conductive to the spring member is increased to thereby stably carry out conduction with a low resistance. In addition, the increase of resistance of the coupling portion which would be caused by a conductive bond can substantially be prevented because the coated film is generally always pressed against the inner surface of the hole by the spring member.

(i) According to a ninth aspect of the present invention, since the fine void between the inner surface of the hole of the hard ferrite and the spring member can be filled with the deformed soft metal layer, the area where the inner surface of the hole is made conductive to the spring member is increased, whereby conduction can be stably carried out with a low resistance.

The accompanying drawings, which are incorporated in and constitute a part of the specification, illustrate a presently preferred embodiment of the invention, and, together with the general description given above and the detailed description of the preferred embodiment given below, serve to explain the principles of the invention.

Japanese Patent Application No. 9-369487 filed Dec. 26, 1997 for which priority is claimed under 35 U.S.C. § 119, is incorporated herein by reference in its entirety including the title, abstract, specification, drawings and claims.

What is claimed is:

1. An electrolyzer comprising:
   an electrode comprising a ferrite material, said electrode including at least one hole formed therein;
   a conductive metal coupling member in said hole; and
   an electrode terminal inserted in said hole, wherein said conductive metal coupling member is deformed when the electrode terminal is inserted into said hole,
   wherein said conductive metal coupling member is a spring member located adjacent a terminal end of an electrode terminal, said spring member being deformed and abutted against an inner surface of said hole when the electrode terminal is inserted into said hole.

2. An electrolyzer according to claim 1, wherein said conductive metal coupling member comprises conductive metal that is softer than the electrode and the electrode terminal.

3. An electrolyzer according to claim 1, wherein said conductive metal coupling member comprises lead or a lead alloy.

4. An electrolyzer according to claim 1, wherein said conductive metal coupling member comprises a metal that melts at a temperature of 500° C. or less and said conductive metal coupling member becomes melted and solidified after it is deformed upon insertion of said electrode terminal.

5. An electrolyzer according to claim 1, wherein an uneven face is formed adjacent to the surface of the terminal end of the electrode terminal which is inserted into said hole.

6. An electrolyzer according to claim 1, wherein a seal member is disposed adjacent said hole.

7. An electrolyzer according to claim 1, wherein conductive paint is coated on at least a portion of said spring member where said spring member is abutted against the inner surface of said hole.

8. An electrode according to claim 1, wherein a soft metal layer comprising a body including at least one metal selected from the group consisting of lead, tin, copper, zinc, cadmium, gallium, indium, silver, palladium, platinum, gold or an alloy of one or more said metals is disposed adjacent the portion where said spring member is abutted against the inner surface of said hole.

9. An electrolyzer according to claim 1, further comprising:
   a lid member comprising a polymer material disposed adjacent said hole.

10. An electrode comprising:
    at least one hole formed within said electrode;
    a conductive metal coupling member in said hole; and
    an electrode terminal inserted into said hole,
    wherein said conductive metal coupling member is deformed when the electrode terminal is inserted into said hole, and
    said electrode comprising a ferrite material,
    wherein said conductive metal coupling member comprises a spring member located adjacent a terminal end of an electrode terminal, said spring member being deformed and abutted against an inner surface of said hole when the electrode terminal is inserted into said hole.

11. An electrode according to claim 10, wherein said conductive metal coupling member is formed in said hole prior to insertion of said electrode terminal into said hole.

12. An electrode according to claim 10, wherein conductive paint is coated on at least a portion of said spring member where said spring member is abutted against the inner surface of said hole.

13. An electrode according to claim 12, wherein a soft metal layer comprising a body including at least one metal selected from the group consisting of lead, tin, copper, zinc, bismuth, cadmium, gallium, indium, silver, palladium, platinum, gold or an alloy of one or more said metals is disposed adjacent the portion where said spring member is abutted against the inner surface of said hole.

14. An electrode according to claim 10, wherein said conductive metal coupling member comprises conductive metal which is softer than the electrode and the electrode terminal.

15. An electrode according to claim 10, wherein said conductive metal coupling member comprises lead or a lead alloy.

16. An electrode according to claim 10, wherein said conductive metal coupling member comprises a metal that melts at a temperature of 500° C. or less and said conductive metal coupling member becomes melted and solidified after it is deformed upon insertion of said electrode terminal.

17. An electrode according to claim 10, wherein an uneven face is formed adjacent to the surface of the terminal end of the electrode terminal that is inserted into said hole.

18. An electrode according to claim 10, wherein a seal member is disposed adjacent said hole.

19. An electrode according to claim 10, wherein said electrode is used for an electrolyzer.

* * * * *